235-382
SR
10/27/87 OR 4,703,163

United States Patent [19]

Genest

[11] Patent Number: 4,703,163

[45] Date of Patent: Oct. 27, 1987

[54] SECURITY SYSTEM

[76] Inventor: Leonard J. Genest, 1061 Tropic La., Santa Ana, Calif. 92705

[21] Appl. No.: 768,258

[22] Filed: Aug. 22, 1985

[51] Int. Cl.[4] .................... G06K 5/00
[52] U.S. Cl. .................... 235/382; 235/380
[58] Field of Search .................... 235/382, 380

[56] References Cited

U.S. PATENT DOCUMENTS

| | | | |
|---|---|---|---|
| 4,283,710 | 8/1981 | Genest | 340/149 R |
| 4,436,993 | 3/1984 | Flies | 235/382 |
| 4,549,076 | 10/1985 | Flies | 235/382 |
| 4,558,175 | 12/1985 | Genest | 235/382 |
| 4,593,185 | 6/1986 | Patzelt | 235/382 |

*Primary Examiner*—Harold I. Pitts
*Attorney, Agent, or Firm*—Nilsson, Robbins, Dalgarn, Berliner, Carson & Wurst

[57] ABSTRACT

A security system having at least one electronic lock and one electronic key. The electronic lock has a memory device which can maintain the data while there is no current supplied to the memory device, and alter the data only when current is supplied, thus providing a non-continuous current drain system. The electronic lock further reduces the chance of error due to high velocity particles which can otherwise alter data in a memory device. The electronic lock applies current to the memory only when a key has been inserted in the lock, and terminates the current to the memory when the key has been removed or the function requested by the key is invalid or the function requested is completed. Alternatively, the electronic lock may apply the current to the memory only if data is to be output from or input to the memory.

6 Claims, 4 Drawing Figures

FIG. 1
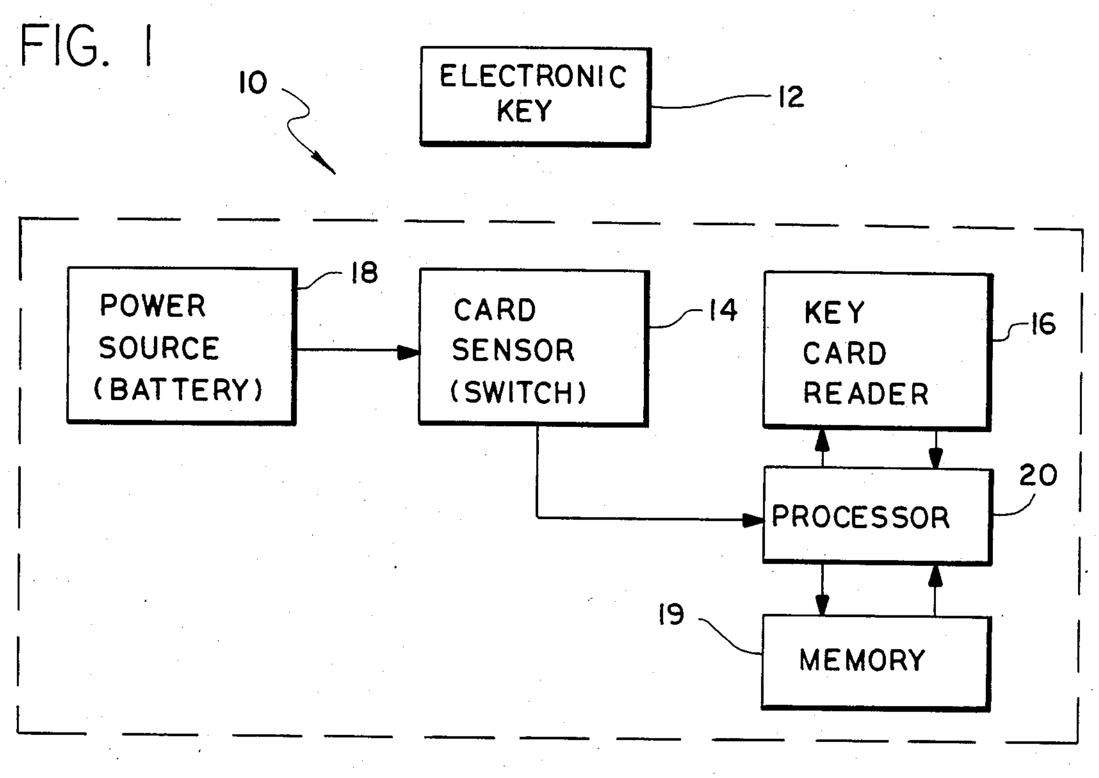
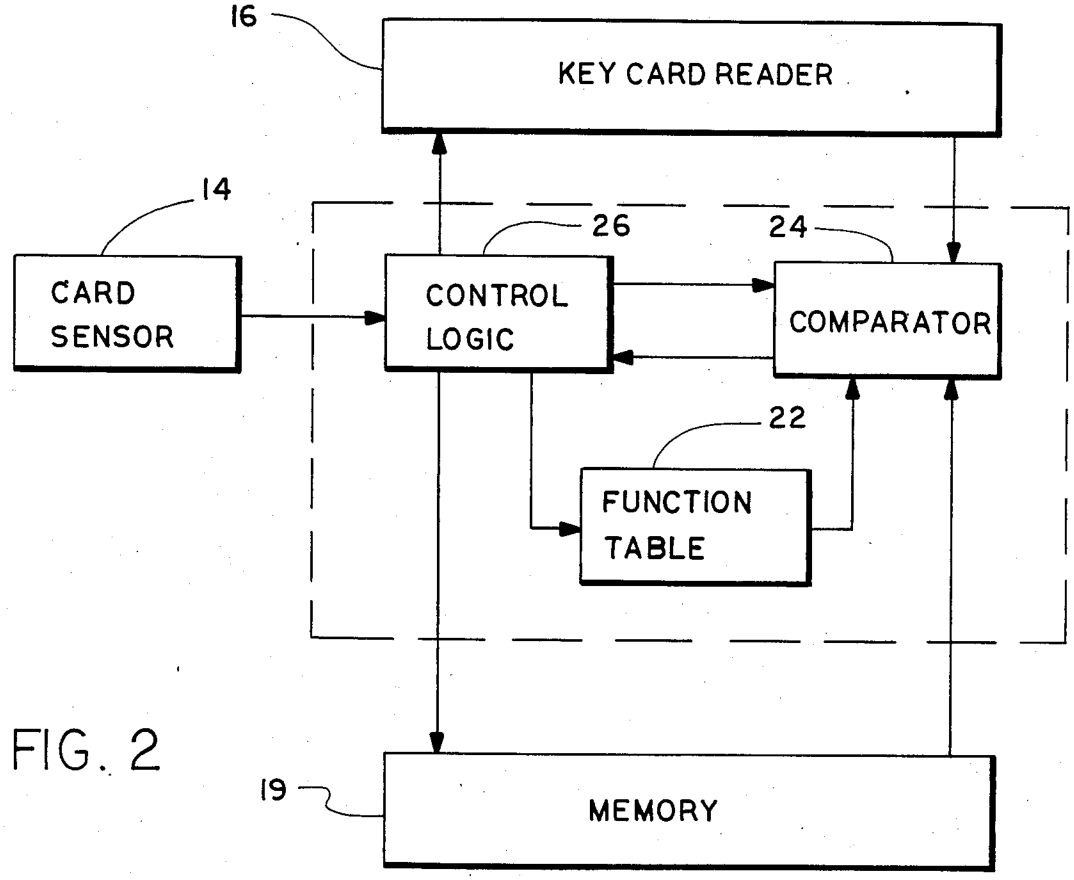
FIG. 2

SECURITY SYSTEM

BACKGROUND OF THE INVENTION

The present invention generally relates to electronic security systems and, more particularly, to reducing errors in data stored in a memory device and reducing the power consumption by the memory maintaining the data.

Typically, most electronic security systems maintain the combination code and/or other data in a memory storage which requires a constant low power. One example of a system such as this is described in U.S. Pat. No. 4,283,710 to Genest. The storage is usually a random access memory (RAM). The RAM can be maintained in the processor or as a separate integrated circuit chip. However, since there is constant electrical energy applied to the RAM, it is possible for the data maintained in the memory to be unintentionally altered or erased. Various factors may cause this effect. For example, static electricity, atmospheric, interference, cosmic radiation or other high velocity particles may effect the RAM chip. Additionally, since the RAM chip cannot maintain the data in its memory without any current, there is a continuous current drain from the battery, thereby reducing the battery life. This is true for all continuously powered systems, and is typical for an electronic security system.

Thus, there is a need for a security system which does not continuously drain the battery or power source, and whose memory device is not prone to errors due to high velocity particles or other environmental interferences.

SUMMARY OF THE INVENTION

An energy conserving security system has at least one electronic lock and at least one electronic key. The electronic lock further includes a memory device which can maintain the data within the memory without the application of electrical energy to the memory. The electronic lock senses the occurence of an electronic key being inserted in the lock, thus providing electrical energy to the lock. The security system further senses the occurence of the electronic key being removed from the electronic lock, and removes the electrical energy from the memory.

Alternatively, the security system may further reduce the power consumption and reduce the chance of error by applying electrical energy to the memory after a key has been received by the lock but only if data must be output from or input to the memory. Typically the electrical energy referred to is electrical current.

BRIEF DESCRIPTION OF THE DRAWINGS

FIG. 1 is a block diagram showing the relationships of the various elements of the present invention;

FIG. 2 is a block diagram showing the interrelationships of various elements in the processor of the system of this invention;

DETAILED DESCRIPTION OF THE PREFERRED EMBODIMENT

Figure 3:
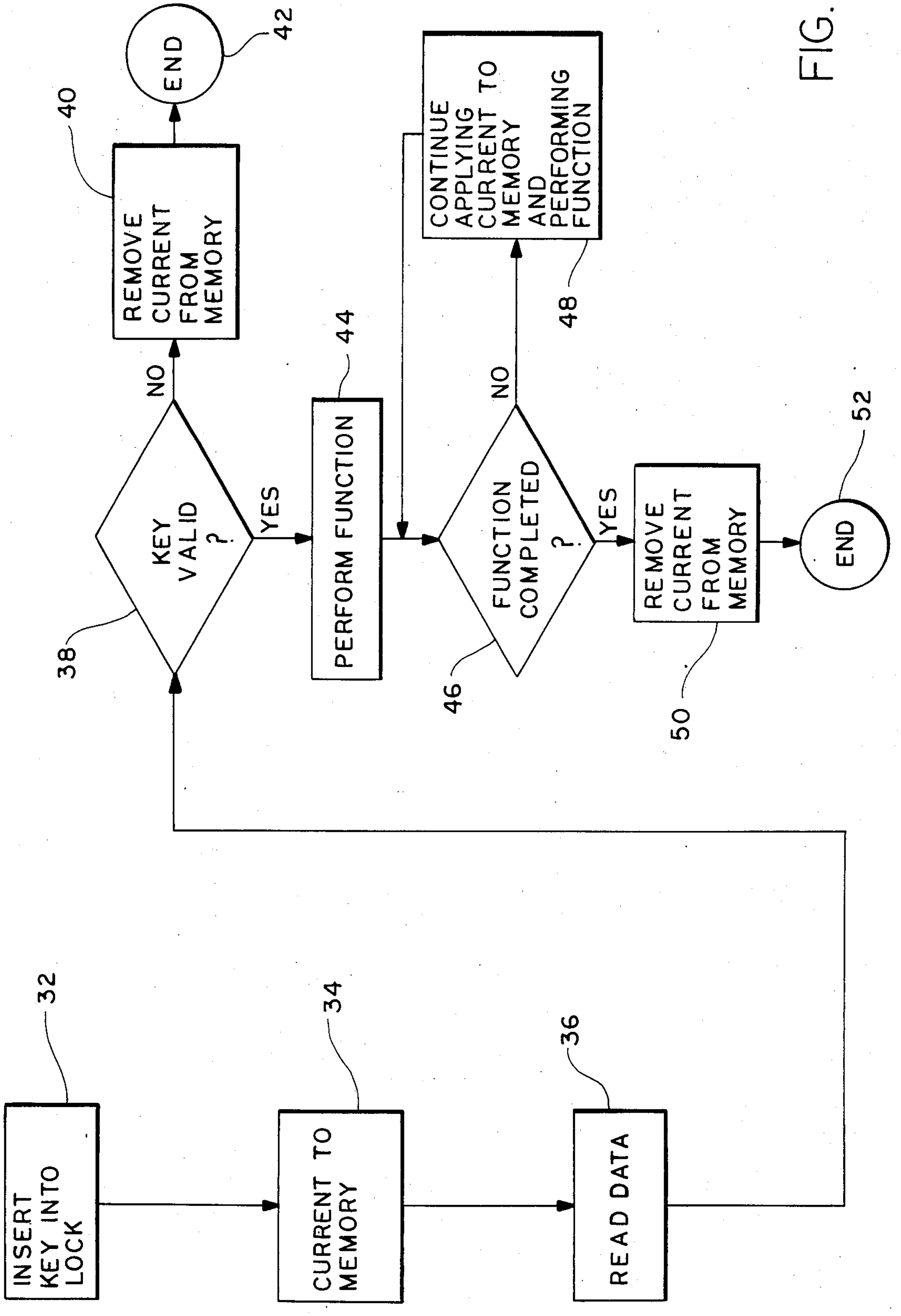
FIG. 3 is a flow diagram showing the operation of the present invention.

The present invention includes at least one lock 10 and at least one electronic key 12. The lock includes a card sensor 14, key card reader 16, a power source 18, a memory 19 and a processor 20. The card sensor 14 may be a switch connected in series between the power source 18 and the processor 20. If a key 12 is inserted into the lock, the switch of the sensor 14 closes, thus transmitting power to the processor 20. If the key 12 is removed, the switch opens, thus terminating transmission of power to the processor 20. The processor 20 determines when to apply power to the other electronic components of the lock 10. When the key card is inserted into the lock and the switch of the card sensor 14 closes, thus transmitting current from the power source 18 to the processor 20; the processor transmits current to the memory 19.

The memory device 19 utilized in the present invention is an electrically alterable programmable read only memory (EAPROM) or an electrically erasable programmable read only memory ($E^2PROM$). The $E^2$-PROM functions exactly the same way as the EAPROM. Thus, although only the EAPROM will be discussed in detail, the ($E^2PROM$) can be substituted.

The EAPROM is a memory device which allows data within the memory to be changed only when power is applied to the EAPROM, and maintains the data in the memory even when there is no power applied to the EAPROM. By utilizing the EAPROM, there is less chance that any high velocity particles altering the data stored in the memory since power is being applied to the EAPROM only when it is necessary. Further, since no power is utilized during the time between key insertions, the current drain from the battery or other power source 18 is reduced.

FIG. 2 shows the components which comprise the central processor 20. Function table 22 is a table of predetermined functions which can be performed by the lock. A few examples of functions which may be performed by the lock are opening the lock, changing data in the lock, or erasing data in the lock. Each predetermined function is identified in the function table 22 by a function code. The key 12 also has a function code encoded on it. A comparator 24 compares two inputs to each other and a signal representing the result of the comparison is provided to control logic 26. The control logic 26 controls the power supplied to function table 22 and comparator 24. The control logic 26 also determines what activity function table 22 or comparator 24 should perform.

The preferred operation of the present invention may be explained by reference to the flow chart of FIG. 3, taken in conjunction with FIGS. 1 and 2.

According to the convention adopted for the flow diagrams herein, the diamond shaped blocks represent information to be supplied or question asked regarding various logic conditions, the information or answers to which determine the path to be taken to the next step. Therefore, the words "yes" or "no" written adjacent to the arrows extending from each diamond-shaped blocks indicate the logic condition or how the question has been answered and the resulting path to be followed. The rectangles contain steps performed or instructions given to the various logic or memory elements involved. The arrows on the connecting line indicate the direction of flow of the steps through the diagram.

In FIG. 3, if a card has not been inserted in the lock the switch 14 is open. Therefore, the power to the entire lock is never received and the power to the lock remains off. If a key has been inserted in the lock (Block 32), switch 14 is closed thus transmitting current to processor 20 which transmits current to the memory 19 (Block 34). The processor 20 then enables card reader 16 to read the data on the key and transmiting this data to processor 20 (Block 36). The function code on the key is compared with the function codes in function table 22 by comparator 24 (Block 38). A key function code is not valid if it does not match any of the function codes in function table 22. A key function code is not valid if it does not match any of the function codes in function table 22. If the key function code is not valid, the processor 20 terminates the current to itself thus terminating the current to the memory (Block 40), the peocessor 20 also terminates the current to all of the electronic components of the lock 10 thereby turning off the lock and ending the operation of the system (Block 42). If the key function code is valid, processor 20 performs the function identified by the key function code (Block 44). If the function has not been completed (Block 46), the processor 20 continues to supply power and performs the function until it is completed (Block 48). Once the function has been completed, the processor terminates transmission of the current to the memory (Block 50) and further terminates the current to itself thereby turning off the lock and ending the operation of the system (Block 52).

Of course, if the key 12 is removed from the lock 10 anytime after it has been inserted into the lock (Block 32), the card sensor switch 14 will open thereby terminating transmission of current to the processor 20. This terminates current to all of the electronic components of the lock thereby turning off the lock and ending the operation of the system.

Figure 4:
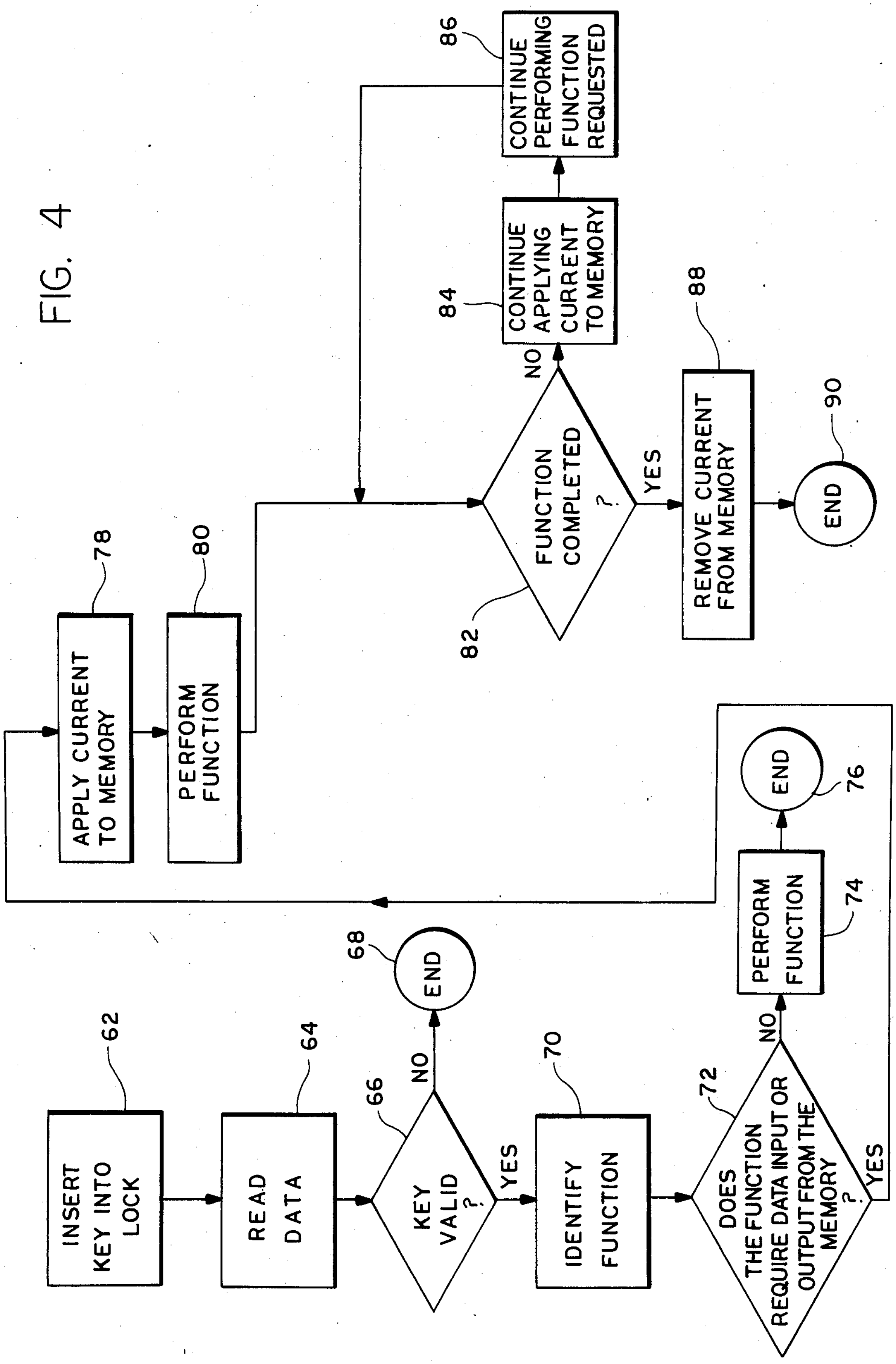
FIG. 4 is a flow diagram showing the alternative operation of the present invention.

An alterative operation of the system is shown in FIG. 4. If a card has not been inserted into the lock, card sensor switch 14 remains open. Therefore, the power to the lock 10 remains off. If a key card has been inserted into the lock (Block 62), card sensor 14 closes thus providing current to the processor 20 which transmits current to the card reader 16 and signals the card reader 16 to read the data on the key card 12 (Block 64). The card reader then transmits the data to processor 20. The function code on the key 12 is compared with the function codes from function table 22 by comparator 24. As aforementioned, a function code is not valid if it does not match any of the function codes from function table 22. If the function code is not valid (Block 66), processor 20 terminates current to itself, thereby terminating current to all electronic components of the lock and ending the operation of the system (Block 108). If the function code on the key 12 is valid (Block 66), the control logic 26 identifies the function represented by the key function code (Block 70) and determines if the function identified requires data to be input to the memory or data to be output from the memory (Block 72). If the function does not require data to be input to or output from the memory, the function identified is performed (Block 74) and upon completion the processor 20 terminates the current supplied to itself thereby turning off the lock and ending the operation of the system (Block 76). However, if the function identified does require data input to or output from the memory, processor 20 transmits the current to the memory 19 (Block 78) and further performs the function represented by the key function code (Block 80). Processor 20 determines if the function represented by the key function code has been completed (Block 82). If the function has not been completed, the processor 20 continues to transmit current to the memory 19 (Block 84) and continues to perform the function represented by the key function code (Block 86). If the function has been completed, the processor 20 terminates transmission of current to the memory 19 (Block 88) and further terminates the current supplied to itself thereby turning the lock off and ending the operation of the system (Block 90).

It can be seen that the operation described by the logic flow diagram in FIG. 4 transmits the current to the memory at a later time (Block 78) than that of the operation described in FIG. 3 (Block 34). Thus, the operation described in FIG. 4 further improves the security of the data in the memory and saves more energy than the operation described in FIG. 3.

From the foregoing, it has been shown that the present invention provides a system which reduces errors occurring by limiting the current applied to the memory to when it is needed and utilizing a memory device such as an EAPROM which can maintain the data without any current supplied to it and further changes state only when current is applied to it. Although a specific embodiment has been illustrated and described, various modifications and changes may be made without departing from the spirit and scope.

What is claimed is:

1. An energy conserving security system having at least one electronic lock and at least one electronic key, comprising:

memory means for maintaining data within said memory means without the application of any electrical energy to said memory means;

means for sensing the occurance of said electronic key inserted in said electronic lock;

means for sensing the occurance of said electronic key being removed from said electronic lock; and first processor means for supplying the power needs of the memory means, said first processor means being adapted to apply electrical energy to said sensing means senses the insertion of said electronic key into said electronic lock, and being adapted to remove said electrical energy from said memory means when said sensing means senses the removal of said electronic key from said electronic lock.

2. The energy conserving security system as defined in claim 1 wherein said electrical energy includes electrical current and said memory means allows state changes only when electrical current is applied to said memory means.

3. The energy conserving security system as defined in claim 2 wherein:

said electronic lock further includes means for determining if an electronic key which is inserted in said electronic lock is invalid; and said first processor means further removing said electrical current from said memory means when said determining means determines said inserted key is invalid.

4. The energy conserving security system as defined in claim 3 wherein:

said electronic lock further includes a means for performing at least one predetermined operation; and said first processor means further removes said electrical current from said memory means when said performing means completes said predetermined operation.

5. An energy conserving security system having at least one electrical lock and at least one electrical key, comprising:

memory means for maintaining data whereby said data can be maintained in said memory means without applying any electrical energy to said memory means;

said electronic lock further includes a means for receiving said electronic key;

second processor means for determining if data must be output from said memory means or if data must be input to said memory means; and said second processor means further applying an electrical current to said memory means when said second processor means determines data must be output from said memory means if data must be input to said memory means.

6. The energy conserving security system as defined in claim 5 wherein said memory means allows state changes only when electrical current is applied to it.

* * * * *

UNITED STATES PATENT AND TRADEMARK OFFICE
CERTIFICATE OF CORRECTION

PATENT NO. : 4,703,163

DATED : October 27, 1987

INVENTOR(S) : Genest

It is certified that error appears in the above-identified patent and that said Letters Patent are hereby corrected as shown below:

Column 1, line 22, delete "effect" and insert --affect--

Column 1, line 40, delete "occurence" and insert --occurrence--

Column 1, line 43, delete "occurence" and insert --occurrence--

Column 3, line 13, deleter "peocessor" and insert --processor--

Column 3, line 33, delete "alterative" and insert --alternative--

Column 3, line 44, delete "afornentioned" and insert --aforementioned--

Column 4, line 32, delete "occurance" and insert --occurrence--

Signed and Sealed this

Twelfth Day of April, 1988

*Attest:*

DONALD J. QUIGG

*Attesting Officer*

*Commissioner of Patents and Trademarks*